# United States Patent [19]

Ohsawa et al.

[11] 4,236,198
[45] Nov. 25, 1980

[54] SWITCHING REGULATOR

[75] Inventors: Mitsuo Ohsawa, Chigasaki; Akio Koizumi, Tokyo; Hiroshi Nakazawa, Kawagoe, all of Japan

[73] Assignee: Sony Corporation, Tokyo, Japan

[21] Appl. No.: 968,135

[22] Filed: Dec. 11, 1978

[30] Foreign Application Priority Data

Dec. 16, 1977 [JP] Japan .................................. 52-151343
Dec. 16, 1977 [JP] Japan .................................. 52-151345

[51] Int. Cl.³ ............................................ H02M 3/335
[52] U.S. Cl. ........................................ 363/49; 363/21; 363/50
[58] Field of Search ................................ 363/18–21, 363/26, 49, 50, 55–56; 323/17, DIG. 1; 361/18

[56] References Cited
U.S. PATENT DOCUMENTS

| 3,120,633 | 2/1964 | Genuit | 363/49 |
| 3,289,098 | 11/1966 | Cannalte | 363/49 X |
| 3,771,040 | 11/1973 | Fletcher et al. | 363/21 |
| 4,037,271 | 7/1977 | Keller | 363/21 |
| 4,156,273 | 5/1979 | Sato | 363/21 X |

Primary Examiner—J. D. Miller
Assistant Examiner—Peter S. Wong
Attorney, Agent, or Firm—Hill, Van Santen, Steadman, Chiara & Simpson

[57] ABSTRACT

A switching regulator includes an inrush current protective resistor and a starter circuit for a pulse width modulator consisting of a starting resistor and a capacitor. At initial starting mode, the inrush current protective resistor is connected to the starter circuit, and after starting both of the inrush current protective resistor and starting resistor are disconnected so as to reduce power dissipation or consumption thereby. At the same time, a DC voltage source for the pulse width modulator is derived from a rectified secondary voltage through the starting capacitor.

7 Claims, 3 Drawing Figures

SWITCHING REGULATOR

BACKGROUND OF THE INVENTION

1. Field of the Invention

The present invention relates generally to a switching regulator, and is directed more particularly to a switching regulator in which the power consumption by a starting register for a pulse width modulator under the stationary state is reduced and hence the efficiency of the switching regulator is improved.

2. Description of the Prior Art

Generally speaking, in the prior art switching regulator, when a power supply switch is tuned ON, there may occur an excessive surge current flowing thereinto and hence the diodes thereof for rectification are damaged. To avoid this, as shown in FIG. 1, there has been proposed such a switching regulator in which, for example, a resistor is provided at the output side of a rectifying circuit for avoiding a surge current, the resistor is opened or closed by a change-over switch, and a pulse width modulator is supplied with a power through a starting resistor upon starting, while supplied with a DC voltage, which is derived therefrom, through a tertiary winding of a transformer and then smoothed, at the stationary state. That is, in FIG. 1, a power supply plug 1, which is supplied with a commercial power supply voltage, is connected through a power supply switch 2 and a power supply fuse 3 to a rectifier circuit 4 whose output side is connected through a surge current preventing resistor 5 and a primary winding 6a of a switching transformer 6 having a magnetic core to the collector of a switching transistor 7 whose emitter is grounded and whose base is connected to a pulse width modulator 8 to be supplied with a PWM (pulse width modulated) signal therefrom. A switch 9 is connected in parallel to the resistor 5. This switch 9 is opened to insert the resistor into the path upon the power supply switch 2 being closed, and which is closed to disconnect the resistor 5 from the path upon the stationary state being reached. The output terminal of the resistor 5 is grounded through a series connection of a starting resistor 10 and a capacitor 11. The connection point between the resistor 10 and the capacitor 11 is connected to one input terminal of the pulse width modulator 8 to apply a starting current thereto and hence to initiate the operation of the switching regulator. The above capacitor 11 serves to gradually increase the duty ratio of an output PWM signal from the pulse width modulator 8 upon the power supply being started by gradually increasing the voltage across the capacitor 11, so that this capacitor 11 is generally called a soft start capacitor. A rectifier circuit 12 is connected across a secondary winding 6b of the switching transformer 6 to provide a stable DC voltage for a load (not shown) in response to the switching operation of the switching transistor 7. A relay winding 13 is connected to the output side of the rectifier circuit 12 to be energized by the output from the rectifier circuit 12 and to open or close the changeover or relay switch 9. The switching transformer 6 has a tertiary winding 6c which is connected at its one end to the ground and at its other end to the input side of a rectifier circuit 14. A DC voltage appearing at the output side thereof is applied to the input terminal of the pulse width modulator 8 as a power voltage during the stationary state. The above other end of the tertiary winding 6c of the transformer 6 is also connected through a rectifier circuit 15 to a variable resistor 16 for adjusting a voltage applied from the rectifier circuit 15 to the pulse width modulator 8. At the output side of the variable resistor 16 there is obtained a compared voltage which corresponds to the DC voltage obtained at the output side of the rectifier circuit 12. This compared voltage is fed to the other input terminal of the pulse width modulator 8 to be compared with a reference voltage. Thus, the pulse width modulator 8 produces, based upon a compared error voltage, a PWM (pulse width modulated) signal which is applied to the base of the switching transistor 7 so that the ON-time thereof is controlled and the rectifier circuit 12 produces at its output side a stable DC voltage.

With a switching regulator constructed as above, the relay switch 9 is opened, the power supply switch 2 is closed, thereafter the switching transistor 7 is supplied with the PWM signal from the pulse width modulator 8 to carry out the switching operation, and then the stabilized DC output voltage is obtained at the output side of the rectifier circuit 12. After the electric power is applied to the switching regulator, the relay winding 13 is energized and hence the relay switch 9 is closed. Thus, the resistor 5 is short-circuited and hence any power consumption by the resistor 5 is avoided upon the stationary state being reached. In the prior art, however, the starting resistor 10 is always inserted in the power supply circuit to the pulse width modulator 8, so that the power consumption by this resistor 10 under the stationary state involves a problem, namely that the efficiency of the switching regulator is deteriorated much.

OBJECTS AND SUMMARY OF THE INVENTION

Accordingly, it is an object of the present invention to provide a switching regulator free from the defects inherent to the prior switching regulators.

It is another object of the invention to provide a switching regulator which is started positively with reduced power consumption through its starting circuit to increase the efficiency.

It is a further object of the invention to provide a switching regulator in which a relay device is used to control the starting circuit.

In accordance with an example of the present invention, a switching regulator is provided which includes a DC voltage source having a pair of first and second terminals, a surge current protective resistor, a switching transformer having primary, secondary, tertiary windings and a magnetic core, a switching transistor having a control electrode, the main current path of which is connected in series between the first and second terminals through the primary winding and the surge current protective resistor, a first rectifying circuit connected across the secondary winding and adapted to be connected with a load, a pulse width modulator supplied with the output from the rectifying circuit so as to produce a PWM control signal the duty ratio of which is proportional to the voltage of the rectifying circuit, a circuit for supplying the PWM control signal to the control electrode of the switching transistor, and a starter circuit for starting the pulse width modulator and consisting of a series connection of a starting resistor and a capacitor the connection point of which is connected to the pulse width modulator. In this case, the switching regulator further comprises a switching circuit for connecting in series the surge current protective resistor to the series connection of the starting resistor and capacitor when the switching regulator starts, while disconnecting the former from the latter to short-circuit said surge current protective resistor, a circuit for detecting the voltage of the tertiary winding of the switching transformer, a second rectifying circuit for rectifying the output of the detecting circuit, and a circuit for supplying the output of the rectifying circuit to the connection point of the starting resistor and capacitor as a DC power source of the pulse width modulator.

Other objects, features and advantages of the present invention will be apparent from the following description taken in conjunction with the attached drawings through which the like reference numerals designate the same elements.

DESCRIPTION OF THE PREFERRED EMBODIMENTS

The present invention will be hereinafter described with reference to the attached drawings.

Figure 1:
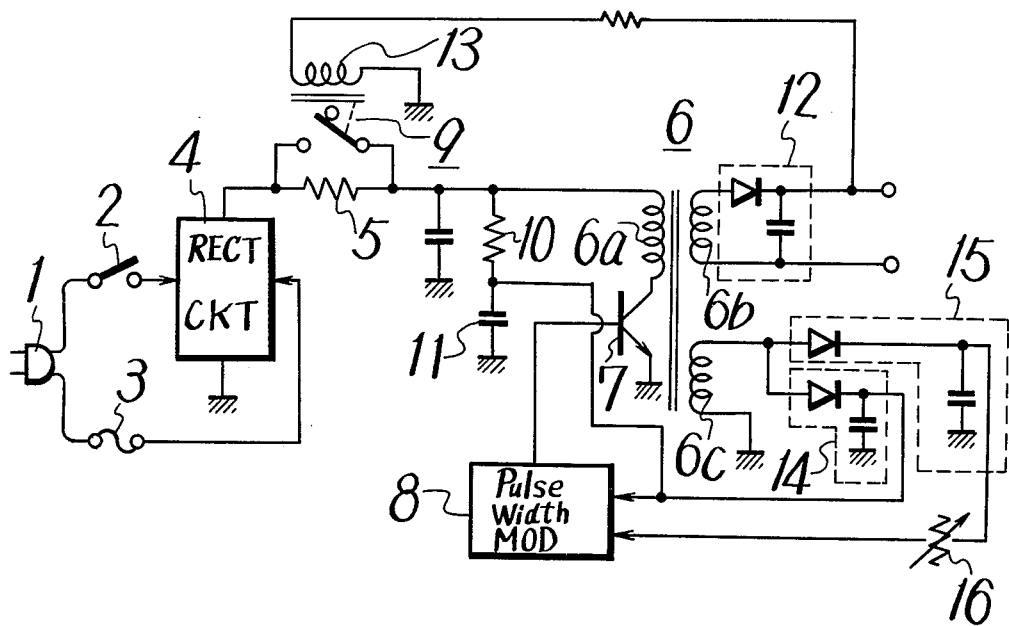
FIG. 1 is a connection diagram showing, partially in block, an example of a prior switching regulator.

An example of the switching regulator according to the present invention will be described with reference to FIG. 2 in which the parts or elements corresponding to those of FIG. 1 are marked with the same reference numerals and their detailed description will be omitted for the sake of brevity.

Figure 2:
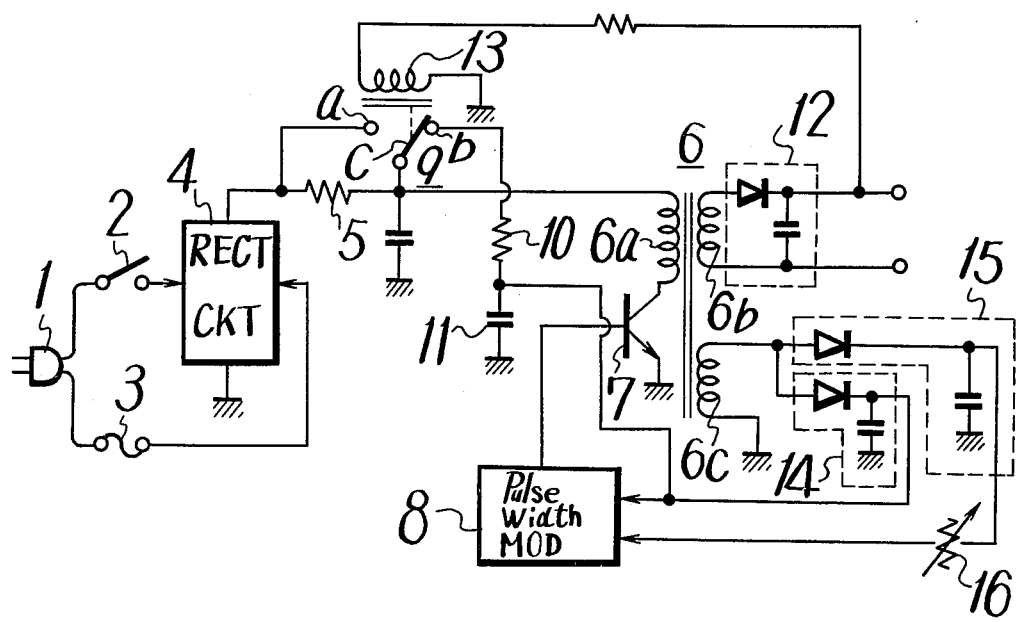
FIG. 2 is a connection diagram showing, partially in block, an example of the switching regulator according to the present invention.

In the example of the invention shown in FIG. 2, one fixed contact a of the relay switch 9 is connected to the connection point between the output terminal of the rectifier circuit 4 and one end of surge current protective resistor 5 for preventing the surge current. The other fixed contact b of the relay switch 9 is connected through the starting resistor 10 to the input terminal of the pulse width modulator 8. A movable contact c of the relay switch 9 is connected to the connection point between the other end of the surge current protective resistor 5 and the input terminal of the primary winding 6a of the switching transformer 6. Thus, upon starting, the starting resistor 10 is inserted into the path from the rectifier circuit 4 to the pulse width modulator 8, while at the stationary state after the start of the switching operation, the current of the starting resistor 10 is opened. The other circuit construction of the example of the invention shown in FIG. 2 is substantially the same as that of the prior art example shown in FIG. 1.

With the switching regulator of the invention shown in FIG. 2, when the movable contact c of the relay switch 9 is put in contact with the fixed contact b, as shown in FIG. 2, and the power supply switch 2 is closed, the DC voltage from the rectifier circuit 4 is applied through the surge current preventive resistor 5 and the primary winding 6a of the transformer 6 to the collector of the switching transistor 7 and also through the starting resistor 10 to the input side of the pulse width modulator 8. Thus, the pulse width modulator 8 operates in response to the starting current and hence puts the switching transistor 7 in its ON position. As a result, the pulse width modulator 8 applies the PWM signal, which is obtained from the respective signals derived from the secondary and tertiary windings 6b and 6c of the switching transformer 6, to the base of the switching transistor 7, so that the latter will start the switching operation. At the time when the switching operation is started, the relay coil 13 is energized by the output from the rectifier circuit 12 and hence the movable contact c of the relay switch 9 is switched to be in contact with the fixed contact a thereof to short-circuit the surge current preventive resistor 5, and also to open the circuit of the starting resistor 10. Thereafter, the voltage of the capacitor 11, which is charged through the rectifier circuit 14, is applied to the pulse width modulator 8 as its power source voltage to keep the stationary state.

According to the switching regulator of the invention having the construction set forth above, the starting resistor for the pulse width modulator is inserted into its start path upon the power supply voltage being supplied thereto, while is opened at the stationary state after the switching operation is started, so that the useless power consumption by the starting resistor under the stationary state can be avoided and accordingly, the efficiency of the switching regulator can be greatly improved.

Figure 3:
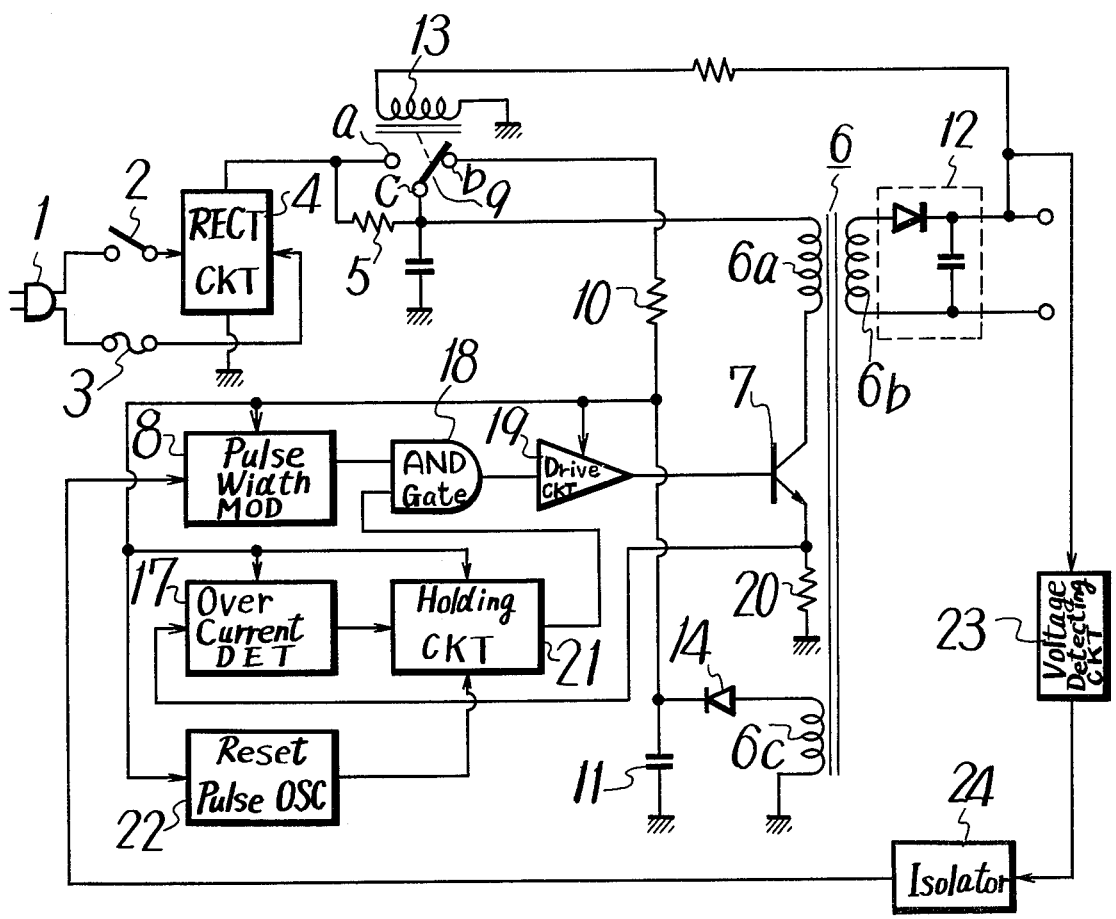
FIG. 3 is a connection diagram showing, partially in block form, another example of the invention.

Turning to FIG. 3, another example of the present invention wil be described, in which the parts corresponding to those of FIG. 2 are marked with the same reference numerals and their detailed description will be omitted for the sake of simplicity.

In the example of the invention shown in FIG. 3, a protective circuit is provided which includes, for example, an over-current detecting circuit or detector 17 such as a resistor 20 connected between the emitter of the switching transistor 7 and the reference point and a holding circuit 21 which will memorize or hold the output from the detector 17. The holding circuit 21 is supplied with the power source voltage from both the ends of the soft start capacitor 11 so as to avoid that even if the switching transistor 7 stops its switching operation upon an overload, the relay switch 9 is subject to a scattering operation. The output side of the holding circuit 21 is connected to one of the input terminals of an AND gate circuit 18 which is supplied at its other input terminal with the output from the pulse width modulator 8. In order to make sure that the holding circuit 21 is sufficiently driven by the voltage charged in the capacitor 11 through the starting resistor 10, the connection point therebetween is connected to the input side of the holding circuit 21. Further, there is provided a reset pulse generating circuit or oscillator 22 which will supply a reset pulse to the holding circuit 21 in response to the ON-state of the power supply switch 2. The input side of the reset pulse oscillator 22 is connected to the connection point of the resistor 10 to the capacitor 11. The output side of the reset pulse oscillator 22 is connected to the input side of the holding circuit 21 as set forth above. The output from the AND gate circuit 18 is applied through a drive circuit 19 to the base of the switching transistor 7 and another input side of the drive circuit 19 is connected to the connection point of the resistor 10 to the capacitor 11. The output from the rectifier circuit 12 which rectifies the pulse signal appearing at the secondary winding 6b of the switching transformer 6, is supplied through a voltage detecting circuit or detector 23 and an isolator 24 to the pulse width modulator 8. The other circuit construction of the example shown in FIG. 3, except for some minor points, is substantially the same as that of FIG. 2.

With the example of the invention shown in FIG. 3, even if the over-current detector 17 is operated by some causes during the operation of the switching regulator, the output from the over-current detector 17 is held by the holding circuit 21 of the next stage which is supplied with the power voltage from the charged capacitor 11 and the gate of the AND gate circuit 18 remains in its closed state. Thus, the PWM signal from the pulse width modulator 18 is not applied to the base of the switching transistor 7 through the AND gate circuit 18 and the drive circuit 19. Therefore, even in the case where the switching regulator does not repeat its start operation, any abnormal operation such as the movable contact a of the relay switch 9 being scattered is avoided. If the power switch 2 is opened and then closed again, the reset pulse oscillator 22 applies a reset pulse to the holding circuit 21. Thus, the holding circuit 21 is reset.

According to the example of the invention shown in FIG. 3, the holding circuit is provided at the output stage of the over-current detector to hold the abnormal state and hence to keep the switching operation in a stop condition until the safe operation is available, so that, without lowering the efficiency, the abnormal operation can be avoided and the switching regulator can start its operation smoothly.

In the above example, the protective circuit detects an over-current, but it will be apparent that it detects an over-voltage with the same effects.

It will be apparent that many modifications and variations could be effected by one skilled in the art without departing from the spirit or scope of the novel concepts of the present invention, so that the spirit or scope of the invention should be determined by the appended claims only.

We claim as our invention:

1. In a switching regulator including a DC voltage source having a pair of first and second terminals, a surge current protective resistor, a switching transformer having primary, secondary and tertiary windings and a magnetic core, a switching transistor having a control electrode, the main current path of which is connected in series between said first and second terminals through said primary winding and said surge current protective resistor, first rectifying means connected across said secondary winding and adapted to be connected with a load, a pulse width modulator to produce a PWM control signal the duty ratio of which is substantially proportional to the voltage of said first rectifying means, circuit means for supplying said PWM control signal to the control electrode of said switching transistor, and starter circuit means for starting said pulse width modulator and consisting of a series connection of a starting resistor and a capacitor, the connection point of which is connected to said pulse width modulator, said switching regulator further comprising:

(a) switching means for connecting in series said surge current protective resistor to said series connection of the starting resistor and capacitor when said switching regulator starts, while disconnecting said series connection from said first terminal of said DC voltage source and short-circuiting said surge current protective resistor when said switching regulator has started;

(b) circuit means for detecting the voltage of said tertiary winding of said switching transformer;

(c) second rectifying means for rectifying the output of said detecting means; and (d) circuit means for supplying the output of said second rectifying means to the connection point of said starting resistor and capacitor as a DC power source of said pulse width modulator.

2. In a switching regulator including a DC voltage source having a pair of first and second terminals, a surge current protective resistor, a switching transformer having primary, secondary and tertiary windings and a magnetic core, a switching transistor having a control electrode, the main current path of which is connected in series between said first and second terminals through said primary winding and said surge current protective resistor, first rectifying means connected across said secondary winding and adapted to be connected with a load, a pulse width modulator to produce a PWM control signal the duty ratio of which is substantially proportional to the voltage of said first rectifying means, circuit means for supplying said PWM control signal to the control electrode of said switching transistor, and starter circuit means for starting said pulse width modulator and consisting of a series connection of a starting resistor and a capacitor, the connection point of which is connected to said pulse width modulator, said switching regulator further comprising:

(a) switching means for connecting in series said surge current protective resistor to said series connection of the starting resistor and capacitor when said switching regulator starts, while disconnecting said series connection from said first terminal of said DC voltage source and short-circuiting said surge current protective resistor when said switching regulator has started;

(b) circuit means for detecting the voltage of said tertiary winding of said switching transformer;

(c) second rectifying means for rectifying the output of said detecting means; and (d) circuit means for supplying the output of said second rectifying means to the connection point of said starting resistor and capacitor as a DC power source of said pulse width modulator;

said switching means comprising relay means having a pair of first and second fixed contacts, a movable contact and a relay winding, said first fixed contact being connected to the connection point of said first terminal of said DC voltage source and one end of said surge current protective resistor, said second fixed contact being connected to the free end of said starting resistor, said movable contact being connected to the other end of said surge current protective resistor, and said relay winding being supplied with the output of said first rectifying means so as to selectively connect said movable contact to one of said first and second fixed contacts in response to the output of said first rectifying means.

3. A switching regulator according to claim 2, in which said relay winding is connected between the output of said first rectifying means and a reference point.

4. A switching regulator according to claim 2, further including:

(a) over-current detecting means for detecting an over-current flowing through said primary winding when said load impedance decreases;

(b) holding means for holding the output of said over-current detecting means; and (c) gate circuit means supplied with both outputs of said pulse width modulator and said holding means so as not to supply the PWM control signal to the control electrode of said switching transistor upon an overload state.

5. A switching regulator according to claim 4, in which said holding means is supplied with its DC voltage source from said second rectifying means.

6. A switching regulator according to claim 5, in which said gate circuit means comprises an AND gate circuit.

7. A switching regulator according to claim 6, further including a drive circuit connected between the control electrode of said switching transistor and the output of said AND gate circuit.

* * * * *